United States Patent
Shartle et al.

(10) Patent No.: US 10,130,951 B2
(45) Date of Patent: Nov. 20, 2018

(54) OPEN-ENDED CONICAL TUBE FOR RECOVERING CELLS FROM A MICROFLUDIC CHIP

(71) Applicants: Robert Shartle, Arnold, CA (US); Behrad Vahidi, Agoura Hills, CA (US); William M. Strauss, Westlake Village, CA (US)

(72) Inventors: Robert Shartle, Arnold, CA (US); Behrad Vahidi, Agoura Hills, CA (US); William M. Strauss, Westlake Village, CA (US)

(73) Assignee: Cynvenio Biosystems, Inc., Westlake, CA (US)

( * ) Notice: Subject to any disclaimer, the term of this patent is extended or adjusted under 35 U.S.C. 154(b) by 48 days.

(21) Appl. No.: 14/428,252

(22) PCT Filed: Sep. 11, 2013

(86) PCT No.: PCT/US2013/059291
§ 371 (c)(1),
(2) Date: Mar. 13, 2015

(87) PCT Pub. No.: WO2014/046942
PCT Pub. Date: Mar. 27, 2014

(65) Prior Publication Data
US 2015/0231632 A1 Aug. 20, 2015

Related U.S. Application Data (60) Provisional application No. 61/702,730, filed on Sep. 18, 2012.

(51) Int. Cl.
*B01L 3/00* (2006.01)
*B01D 21/26* (2006.01)

(52) U.S. Cl.
CPC ........ *B01L 3/50825* (2013.01); *B01D 21/262* (2013.01); *B01L 2300/04* (2013.01); *B01L 2400/0409* (2013.01)

(58) Field of Classification Search
CPC ........ B01L 3/50825; B01L 2400/0409; B01L 2300/04; B01D 21/262; B04B 5/0414; B04B 5/0421; B04B 2005/0435
(Continued)

(56) References Cited

U.S. PATENT DOCUMENTS

| 4,244,694 A | 1/1981 | Farina et al. |
| 4,270,921 A | 6/1981 | Graas |

(Continued)

FOREIGN PATENT DOCUMENTS

| CN | 101570787 | 11/2009 |
| EP | 1764123 A1 | 3/2007 |

(Continued)

OTHER PUBLICATIONS

WO patent application No. PCT/US2013/059291, International Search Report and Written Opinion dated Dec. 19, 2013.
(Continued)

*Primary Examiner* — Walter D. Griffin
*Assistant Examiner* — Shuyi S. Liu
(74) *Attorney, Agent, or Firm* — Weaver Austin Villeneuve & Sampson LLP (57) ABSTRACT

Provided are devices for recovery of cells from a microfluidic device. In particular, provided are open-ended conical tubes for recovery of cells from a microfluidic device and methods of use. In some embodiments, the open-ended conical tubes comprise: i) a nipple portion (7), wherein the nipple portion (7) comprises a length in the range of 0.2 to 0.3 inches, a diameter in the range of 0.2 to 0.3 inches, wherein the nipple portion (7) comprises a narrow orifice;

(Continued)

ii) a conical portion (5) attached to and in fluid communication with the nipple portion, wherein the conical portion (5) has a length in the range of 1.0 to 1.5 inches and the angle of the outer surface of the conical portion (5) of the tube in relation to the outer surface of a cylindrical portion (1) of the tube is between 30° to 45°, wherein an outer circumferential surface of the conical portion (5) is attached to a flange (6) comprising a cylindrical cavity (12), wherein the cylindrical cavity (12) is formed into the surface of the flange (6), and the flange (6) is attached to the outer circumferential surface of the conical portion (5) of the tube such that the opening of the cylindrical cavity (12) extends perpendicularly with respect to the longitudinal axis of the tube, wherein a cap of a PCR tube fits into the cylindrical cavity (12) in the flange (6);

iii) the cylindrical portion (1) attached to and in fluid communication with the conical portion (5) and having an axis substantially co-linear with an axis of the conical portion (5), wherein the cylindrical portion (1) comprises a wide orifice and threads (8) on the outer surface abutting the wide orifice to accommodate a cap for the conical tube, wherein the cylindrical portion (1) comprises a length in the range of 2.2 to 2.8 inches, an outer diameter in the range of 1.10 to 1.19 inches along its entire length and an inner diameter configured to accommodate one or more microfluidic chips or slides.

16 Claims, 9 Drawing Sheets

(58) Field of Classification Search
USPC .............................. 494/37, 16, 20; 422/548
See application file for complete search history.

(56) References Cited

U.S. PATENT DOCUMENTS

| | | | | |
|---|---|---|---|---|
| 5,295,599 | A * | 3/1994 | Smith | B01L 3/50825 |
| | | | | 215/204 |
| 5,824,272 | A | 10/1998 | Uchida | |
| 2006/0037903 | A1 | 2/2006 | Smith et al. | |
| 2007/0129692 | A1 * | 6/2007 | Enomoto | A61M 25/0075 |
| | | | | 604/284 |
| 2008/0072994 | A1 * | 3/2008 | Kim | B01L 3/5021 |
| | | | | 141/34 |
| 2010/0015690 | A1 * | 1/2010 | Heavner | B01L 3/0275 |
| | | | | 435/288.4 |
| 2011/0300609 | A1 | 12/2011 | Lim et al. | |
| 2012/0003626 | A1 * | 1/2012 | Kshirsagar | C12M 47/02 |
| | | | | 435/5 |
| 2012/0011945 | A1 * | 1/2012 | Lee-Smith | B01L 3/508 |
| | | | | 73/864.91 |
| 2012/0021407 | A1 | 1/2012 | Haj-Ahmad | |
| 2013/0196841 | A1 * | 8/2013 | Dobrowolski | B01L 3/502 |
| | | | | 494/37 |

FOREIGN PATENT DOCUMENTS

FR 2625691 7/1989
WO WO 2012016720 A1 * 2/2012 .............. B01L 3/502

OTHER PUBLICATIONS

WO patent application No. PCT/US2013/059291, International Preliminary Report on Patentability dated Apr. 2, 2015.
CN patent application No. 201380060197.1, Office Action dated Oct. 10, 2016.
EP patent application No. 13839960.5, Extended European Search Report dated May 3, 2016.
CN patent application No. 201380060197.1, Second Office Action dated Jun. 14, 2017.
EP patent application No. 13839960.5, Office Action dated Feb. 16, 2018.

* cited by examiner

OPEN-ENDED CONICAL TUBE FOR RECOVERING CELLS FROM A MICROFLUDIC CHIP

CROSS-REFERENCE TO RELATED APPLICATIONS

This application is a U.S. national phase under 35 U.S.C. § 371 of International Application No. PCT/US2013/059291, filed Sep. 11, 2013, which claims the benefit under 35 U.S.C. § 119(e) of U.S. Provisional Application No. 61/702,730, filed on Sep. 18, 2012, all of which are hereby incorporated herein by reference in their entireties for all purposes.

FIELD

Provided are devices for recovery of cells from a microfluidic device.

BACKGROUND

Methods for removing cells retained in a microfluidic chip have involved using a needle and syringe, e.g., either to flush the chip with fluid to force out the cells or to draw out the cells and remaining fluid in the chip. Such methods are neither efficient, quantitative, nor sterile.

SUMMARY

In one aspect, the provided are open-ended conical tubes. In some embodiments, the open-ended conical tubes comprise: i) a nipple portion (7), wherein the nipple portion (7) comprises a length in the range of 0.2 to 0.3 inches, a diameter in the range of 0.2 to 0.3 inches, wherein the nipple portion (7) comprises a narrow orifice;
ii) a conical portion (5) attached to and in fluid communication with the nipple portion, wherein the conical portion (5) has a length in the range of 1.0 to 1.5 inches and the angle of the outer surface of the conical portion (5) of the tube in relation to the outer surface of a cylindrical portion (1) of the tube is between 30° to 45°, wherein an outer circumferential surface of the conical portion (5) is attached to a flange (6) comprising a cylindrical cavity (12), wherein the cylindrical cavity (12) is formed into the surface of the flange (6), and the flange (6) is attached to the outer circumferential surface of the conical portion (5) of the tube such that the opening of the cylindrical cavity (12) extends perpendicularly with respect to the longitudinal axis of the tube, wherein a cap of a PCR tube fits into the cylindrical cavity (12) in the flange (6);
iii) the cylindrical portion (1) attached to and in fluid communication with the conical portion (5) and having an axis substantially co-linear with an axis of the conical portion (5), wherein the cylindrical portion (1) comprises a wide orifice and threads (8) on the outer surface abutting the wide orifice to accommodate a cap for the conical tube, wherein the cylindrical portion (1) comprises a length in the range of 2.2 to 2.8 inches, an outer diameter in the range of 1.10 to 1.19 inches along its entire length and an inner diameter configured to accommodate one or more microfluidic chips or slides. In some embodiments, the conical tubes further comprise a cap that twists onto the threads on the outer surface of the cylindrical portion abutting the wide orifice. In some embodiments, the conical tubes further comprise a cap that snaps onto the threads on the outer surface of the cylindrical portion abutting the wide orifice. In some embodiments, the conical tube is comprised of high-density polyethylene. In some embodiments, the conical tube is produced by a molding process. In some embodiments, the conical tube is produced by a blow molding process. In some embodiments, the cylindrical portion has an inner diameter sized to engage with a microfluidic chip. In some embodiments, the conical tube further comprises a microfluidic chip inside the tube. In some embodiments, the conical tube is as depicted in FIGS. 1, 2, 3, 4 and/or 5.

In another aspect, provided are methods of collecting cells from a microfluidic chip. In some embodiments, the methods comprise:

a) placing the microfluidic chip into the conical tube of any one of claims 2 to 8, wherein an outlet of the microfluidic chip is placed towards the narrow orifice of the nipple portion;

b) centrifuging the microfluidic chip inside of the conical tube; and c) collecting the cells in the 0.5 mL PCR tube sized to seal to the conical tube. In some embodiments, the centrifuging is at about 300×g or less, e.g., about 200×g or about 100×g. In some embodiments, the centrifuging is in a swinging bucket rotor. In some embodiments, the method is performed under sterile conditions. In some embodiments, the method further comprises the step of refilling the microfluidic chip with an isotonic fluid and repeating steps a) through c).

DETAILED DESCRIPTION

1. Introduction

The present application is based, in part, on the development and discovery of a spin elute device to efficiently and quantitatively recover cells retained in a microfluidic chip. Target cells isolated from whole blood, e.g., via magnetic separation, are retained in the microfluidic chip, whereas non-target cells are washed out of the chip. Target cells retained in the capture microfluidic chip are recovered out of the capture microfluidic chip and put into a tube or other container for subsequent analysis. The ability to do this is important for all further analysis of the target cell population. In order to recover these cells we designed and developed the spin elute devices described herein to collect the target cells in a simple, sterile and convenient manner that is both efficient and quantitative. The spin elute device works by low speed centrifugation (e.g., about 300×g or lower). High speed centrifugation could result in trapping of cells in the microfluidic chip.

The microfluidic chip is placed in the device which acts as a carrier. The device is placed in a centrifuge and spun at about 300 rpm for about 30 sec. The cells and the solutions in the capture microfluidic chip (about 200-250 μl) and spun out into a 500 μl collection tube attached to the bottom of the device into which the target cells are sedimented or pelleted. A second wash of the capture microfluidic chip is then done and this fluid of the second wash (about 200-250 μl) is further collected in the 500 μl collection tube.

The device can be constructed by any means, can be composed of any material which does not bind cells, is strong enough to resist the forces of centrifugation, and is sterile and free from contaminating DNA, RNA and proteins.

2. Structural Features of Spin Elute Tube

Figure 1:
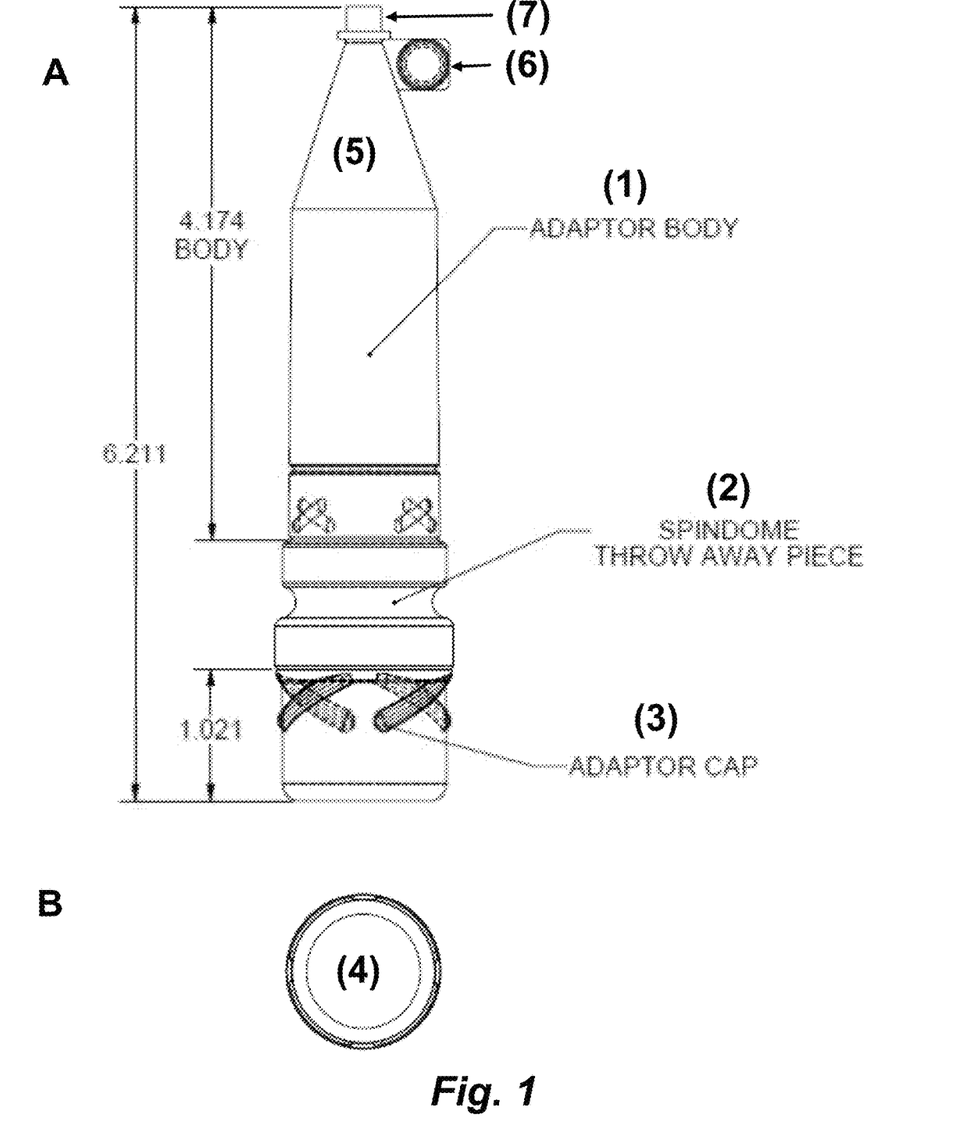
FIGS. 1A-B provide a (A) side view and (B) bottom view (4) illustration of a spin elute or open-ended conical tube.
Figure 2:
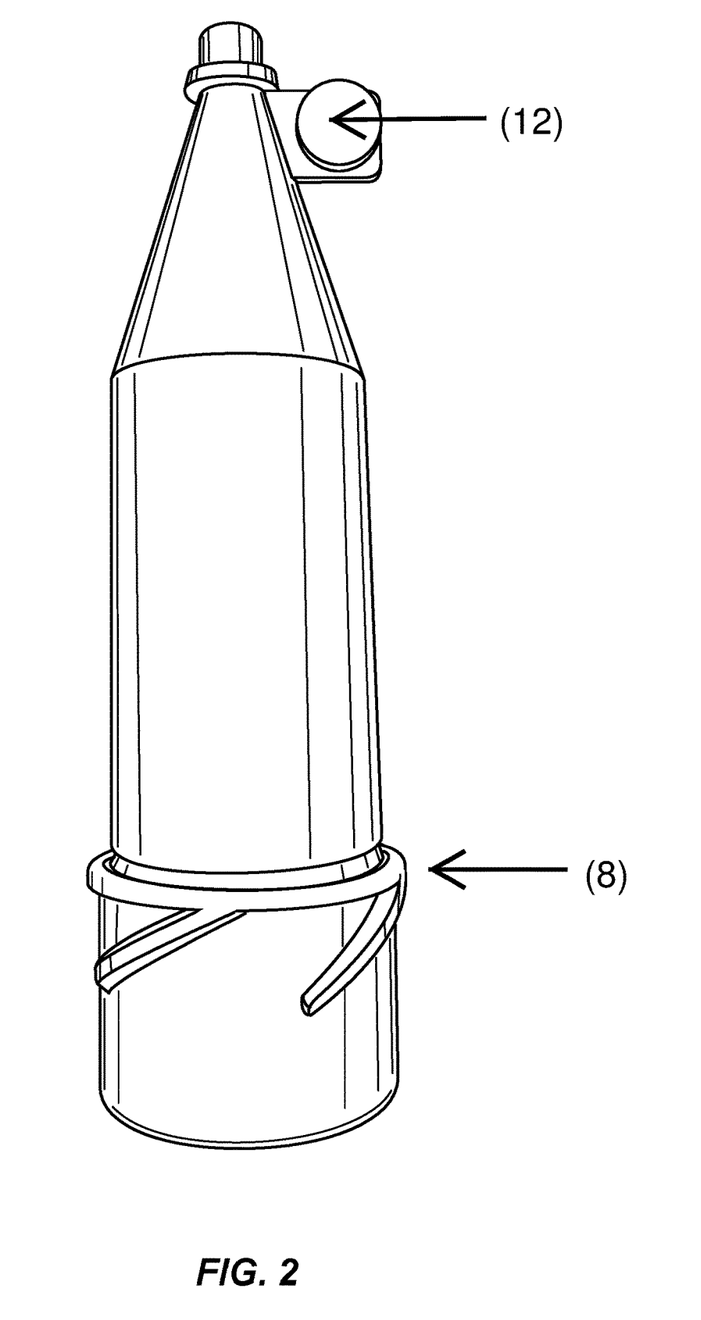
FIG. 2 illustrates a side view of a spin elute tube, with the flange to the side.
Figure 3:
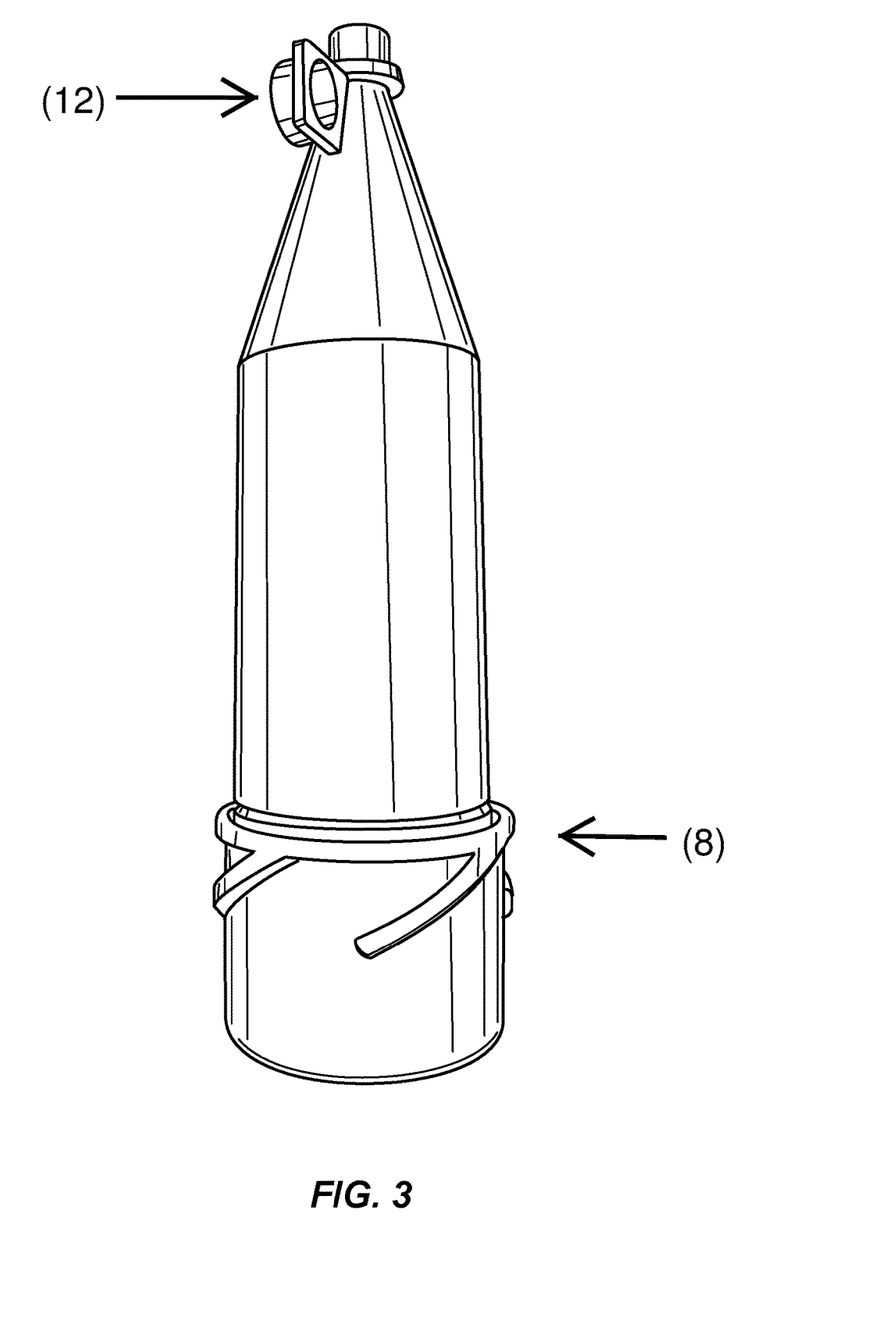
FIG. 3 illustrates a side view of a spin elute tube, viewing the flange from the top.
Figure 4:
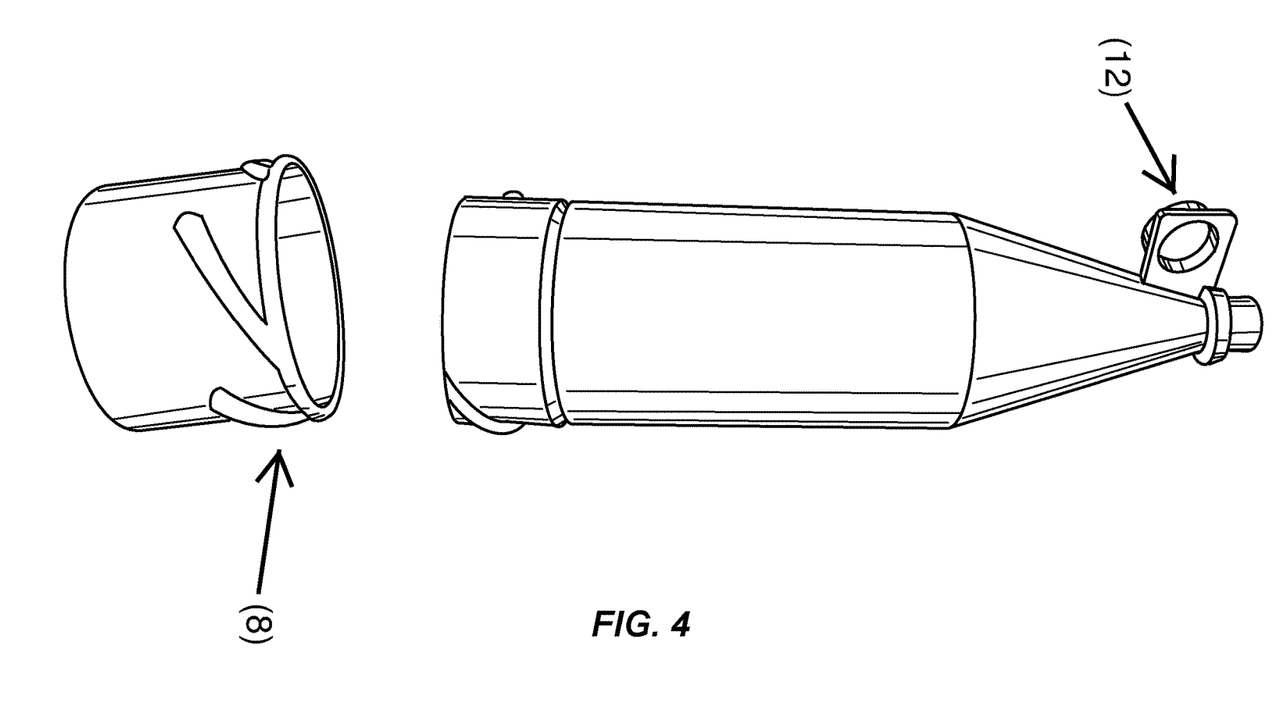
FIG. 4 illustrates a side view of the spin elute tube with the adaptor cap removed.
Figure 5:
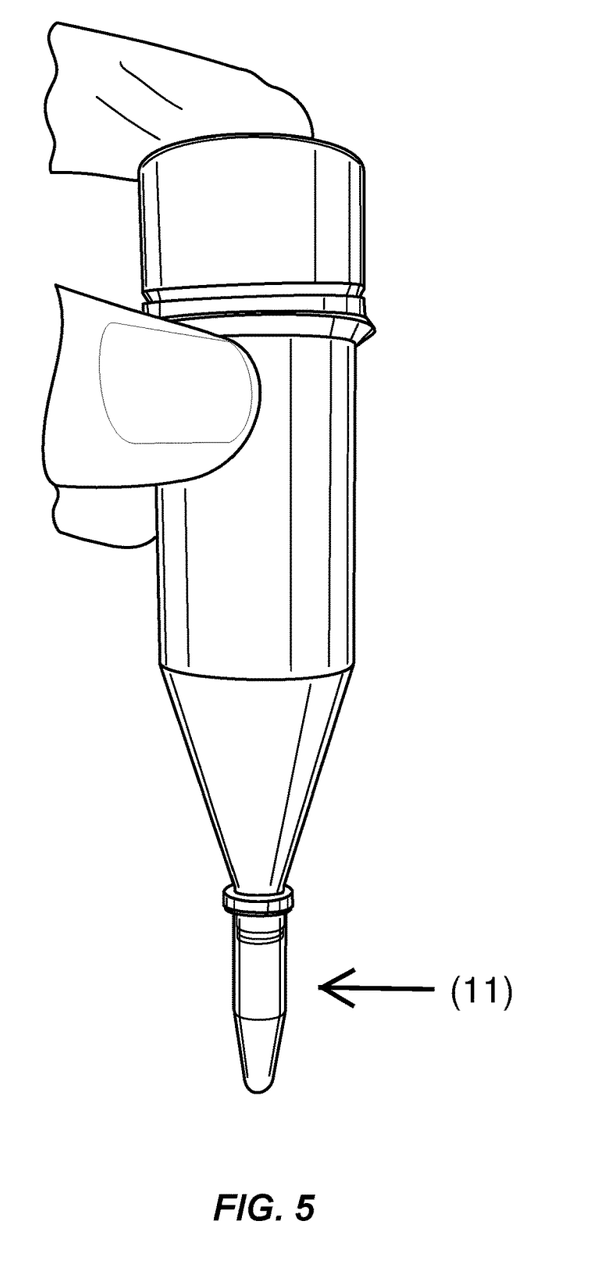
FIG. 5 illustrates a side view of the spin elute tube attached to a 0.5 mL PCR tube.
Figure 6:
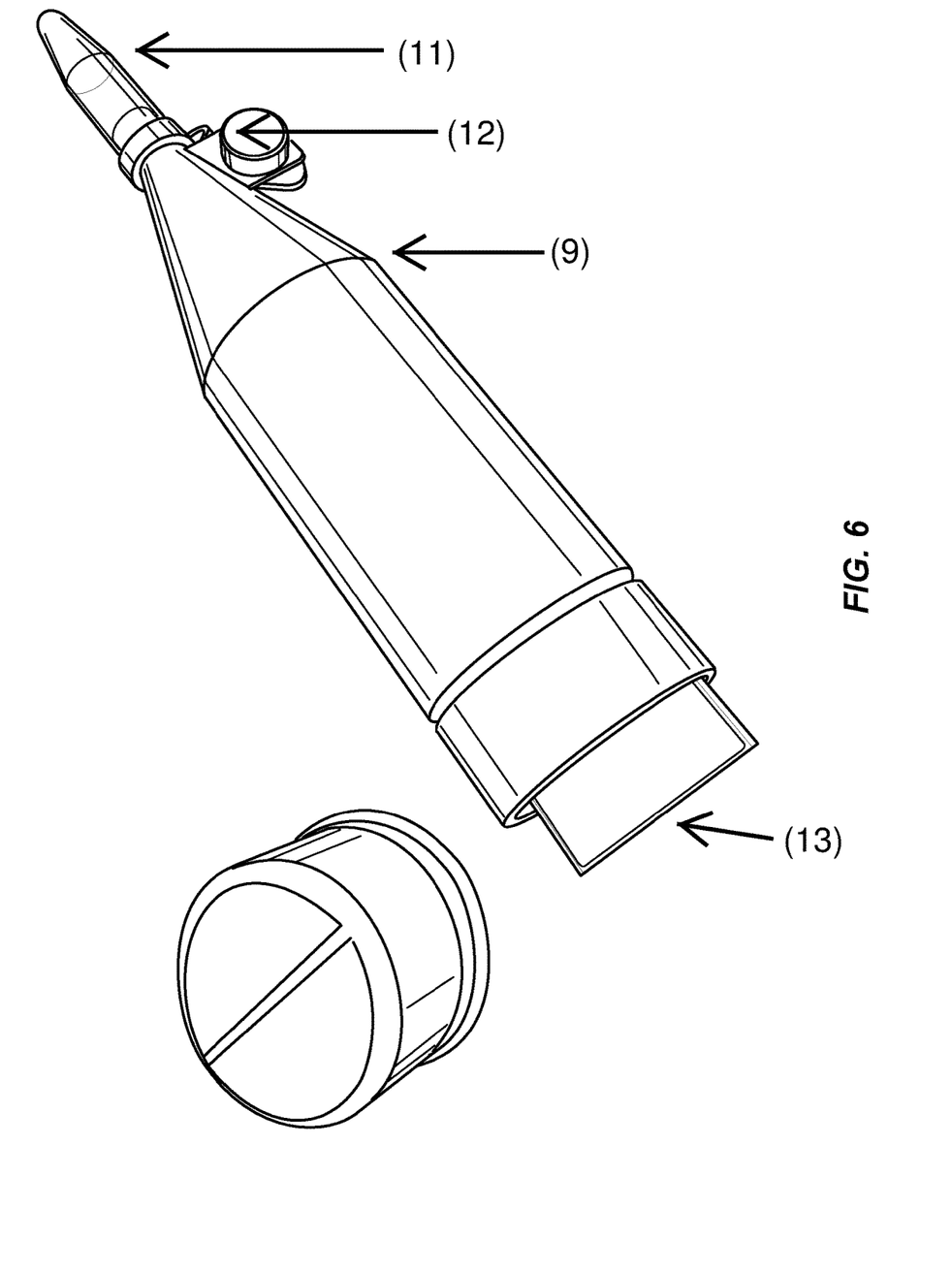
FIG. 6 illustrates a spin elute tube attached to a 0.5 mL PCR tube (11) and containing a microfluidic chip (13) in the interior space of the cylindrical portion. An illustrative adaptor cap is also shown.
Figure 7:
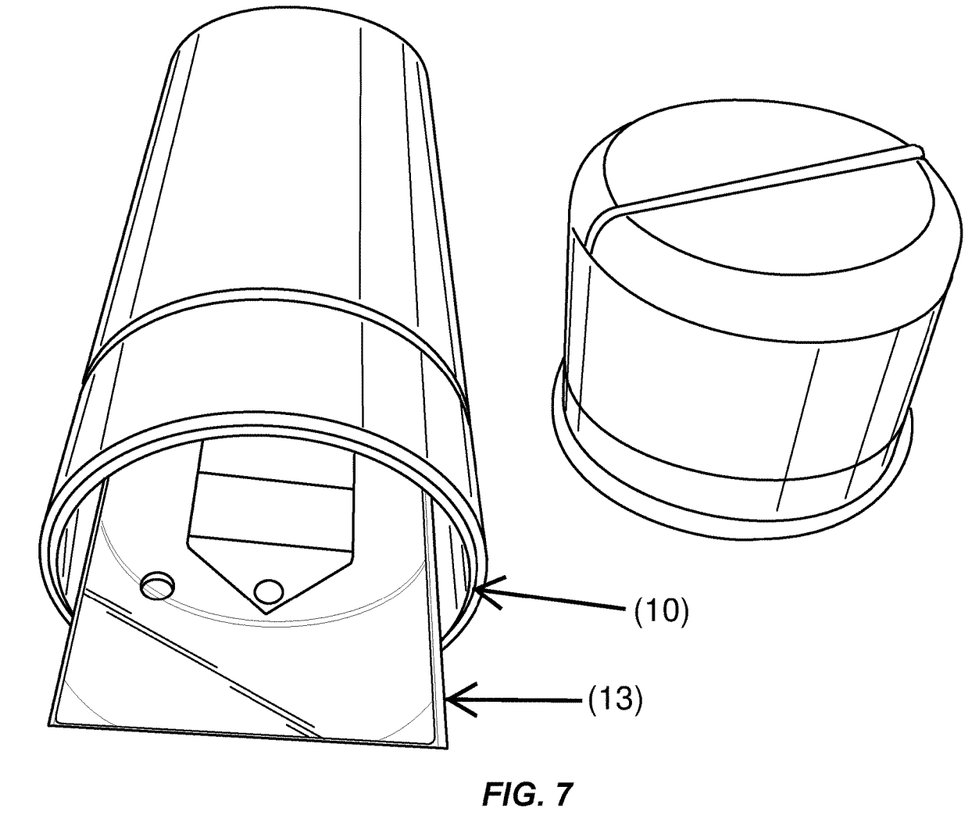
FIG. 7 illustrates a spin elute containing a microfluidic chip (13) in the interior space of the cylindrical portion. An illustrative adaptor cap is also shown.
Figure 8:
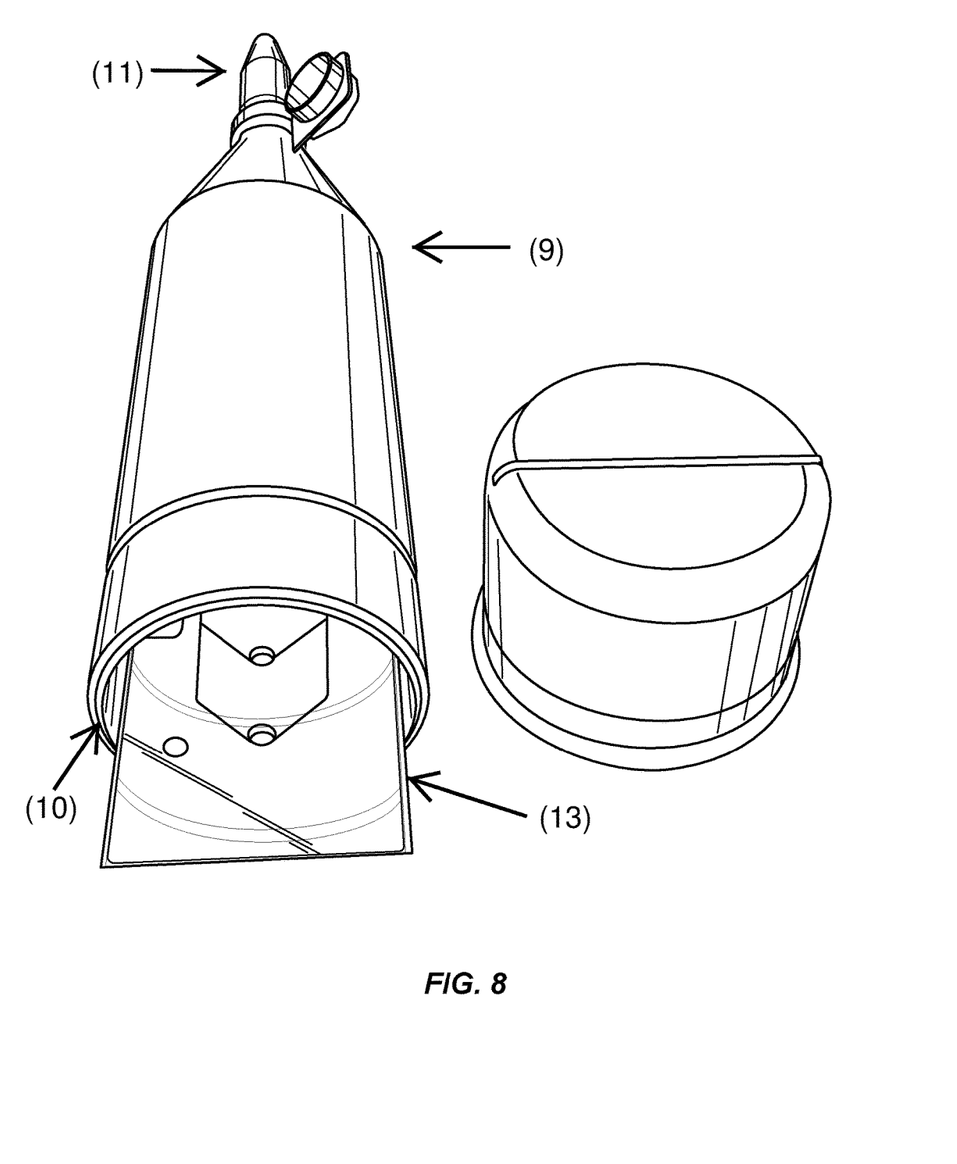
FIG. 8 illustrates a spin elute tube attached to a 0.5 mL PCR tube (11) and containing a microfluidic chip (13) in the interior space of the cylindrical portion. An illustrative adaptor cap is also shown.
Figures 9, 9A, 9B:
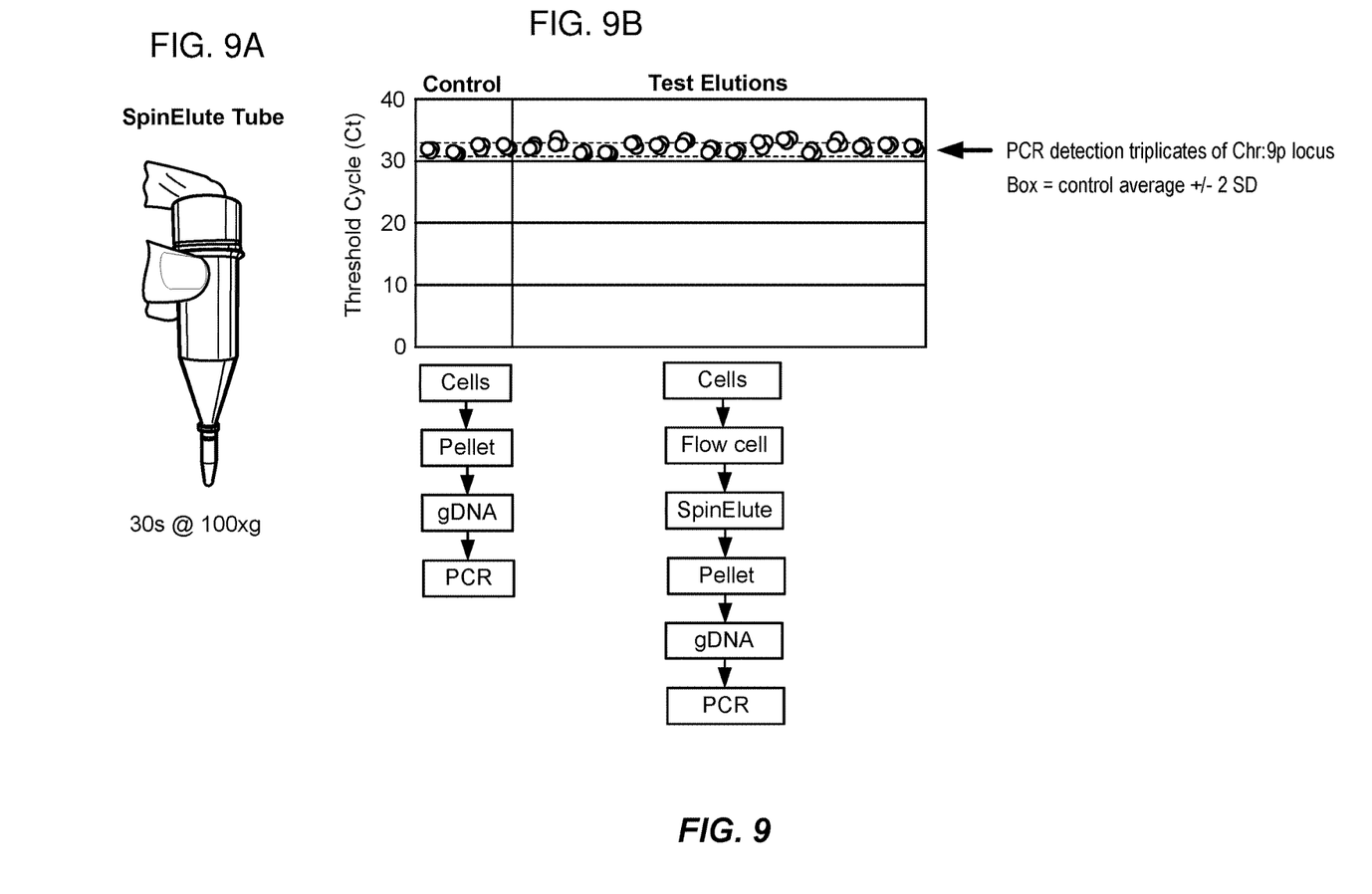
FIGS. 9A-B illustrate the results of a validation experiment using a spin elute tube to collect cells from a microfluidic chip. A. 1000 cells were loaded into a microfluidic chip in triplicates and spun out using a spin elute tube into a pellet. B. The pellet threshold cycle (Ct) was measured and compared between pelleting cells eluted into a PCR tube (11) from a microfluidic chip using a spin elute tube and pelleting the cells directly (e.g., without processing through microfluidic chip or spin elute tube) into a PCR tube. The PCR based detection was equivalent whether the cells were recovered from the microfluidic chip or directly pelleted.

Generally, the spin elute tubes are designed to fit into a bucket of a swing bucket rotor that accommodates 50 mL conical tubes. Additionally, the spin elute tubes are sized to accommodate microfluidic chips that have been used to separate circulating tumor cells, stem cells or other types of cells. Microfluidic chips for use in the present conical spin elute tubes include without limitation those described in U.S. Patent Nos. 7,807,454 and 8,263,387, hereby incorporated herein by reference in their entirety for all purposes. Turning to FIG. 1, the spin elute tubes comprise a body portion (1) and a cap portion (3, side view) and (4, bottom view). The body comprises a nipple (7), a conical portion (5), a cylindrical portion (1), and has a wide orifice at the top of the cylindrical portion and a narrow orifice through the nipple portion (7). The outer surface of the section of the cylindrical portion of the tube body that attaches to the cap has threads (8) to allow the cap to fit or seal to the tube body, e.g., by twisting or snapping. As appropriate, the threads (8) may be diagonal or form a spiral to accommodate attachment of the cap by twisting (e.g., FIGS. 2-4) or be circumferential to accommodate attachment of the cap by snapping (e.g., FIGS. 5-8). The threads on the body of the tube can be raised ridges or grooves, as appropriate. In embodiments where the tube has raised ridged threads, the cap will have groove threads such that the cap will fit or seal onto the tube (FIGS. 2-4). In embodiments where the tube has groove threads, the cap will have raised ridge threads such that the cap will fit or seal onto the tube. The outer surface of the conical portion (5) of the tube that abuts to the nipple (7) has a flange (6) that sticks out perpendicularly from the tube. The flange has a raised circle or cylindrical shape (12). The nipple has an outer diameter so that it can fit into a standard 0.5 mL PCR tube (11) and form a liquid impermeable seal. The convex surface of the cylindrical shape in the flange is of a size to fit the cap of the 0.5 mL PCR tube (11) snugly enough such that cap remains anchored in the flange during centrifugation.

In varying embodiments, the body of the spin elute tube has a vertical length of about 4.0 to about 4.5 inches, e.g., about 4.0, 4.1, 4.2, 4.3, 4.4 or 4.5 inches. The nipple portion of the body has a length and outer surface diameter such that it can fit snugly into a 0.5 mL PCR tube (11) and form a liquid impermeable seal. In varying embodiments, the nipple portion (7) of the tube body has a length in the range of about 0.2 to about 0.3 inches, e.g., about 0.20, 0.21, 0.22, 0.23, 0.24, 0.25, 0.26, 0.27, 0.28, 0.29, or 0.30 inches, and an outer diameter of in the range of about 0.2 to about 0.3 inches, e.g., about 0.20, 0.21, 0.22, 0.23, 0.24, 0.25, 0.26, 0.27, 0.28, 0.29, or 0.30 inches. The outer diameter of the nipple region (7) and conical region (5) of the body abutting the nipple is narrow enough to allow for the attachment of a flange (6) comprising a cylindrical cavity (12), wherein the cylindrical cavity (12) is formed into the surface of the flange (6), and the flange (6) is attached to the outer circumferential surface of the conical portion (5) of the tube such that the opening of the cylindrical cavity (12) extends perpendicularly with respect to the longitudinal axis of the open-ended conical tube. The cap of the PCR tube (11) can plug into the cylindrical cavity of the flange (12) and the tube with the flange can fit in the well of the centrifuge bucket. The conical portion (5) of the tube body has a vertical length in the range of about 1.0 inches to about 1.5 inches, e.g., about 1.0, 1.05, 1.1, 1.15, 1.2, 1.25, 1.3, 1.35, 1.4, 1.45, 1.5 inches. In varying embodiments, the angle of the outer surface of the conical portion of the tube in relation to the outer surface of the cylindrical portion of the tube is between about 30° to about 45°, e.g., about 30°, 35°, 40° or 45°. The cylindrical portion of the tube body can have a vertical length in the range of about 2.2 inches to about 2.8 inches, e.g., about 2.2, 2.3, 2.4, 2.5, 2.6, 2.7 or 2.8 inches. The outer diameter of the cylindrical portion of the tube is in the range of about 1.10 inches to about 1.19 inches, e.g., 1.10, 1.12, 1.13, 1.14, 1.15, 1.16, 1.17, 1.18 or 1.19 inches along its entire length. In one embodiment, the vertical length of the body of the tube is about 4.2 inches, the nipple portion having a length and outer diameter of about 0.25 inches, the conical portion having a vertical length of about 1.25 inches and an outer surface angle of about 30°, and the cylindrical portion having a length of about 2.5 inches.

The cap portion (3) of the tube has threads (8) on its inner surface such that the cap can twist onto the wide orifice at the top of the cylindrical portion (FIGS. 2-4). In varying embodiments, the cap has a vertical length of about 1.00 to about 1.10 inches, e.g., about 1.00, 1.01, 1.02, 1.03, 1.04, 1.05, 1.06, 1.07, 1.08, 1.09 or 1.10 inches. The diameter of the cap is sufficiently wider than the cylindrical portion of the tube body so that the cap can twist snugly onto the tube body.

Typically, the inner surface of the cylindrical portion of the body is smooth and unfeatured, e.g., without topographical features. In some embodiments, the inner surface of the cylindrical portion of the body comprises guides (e.g., raised parallel vertical ridges along the length of the inner surface of the cylindrical portion of the tube (10)) for accommodating one or more microfluidic chips or slides (13) in the tube.

In varying embodiments, the thickness of the walls of the spin elute tube are in the range of about 0.030 to about 0.10 inches, e.g., 0.030. 0.035, 0.040, 0.045, 0.050, 0.055, 0.060, 0.065, 0.070, 0.075, 0.080, 0.085, 0.090 or 0.10 inches. In one embodiment, the thickness of the walls of the fluid reservoir about 0.050. The thickness of the walls of the spin elute tube can be uniform or varying, as appropriate. The spin elute tubes are generally made of materials that are inert to and which do not bind with or dissolve when contacted with biological fluids, e.g., whole blood, cell suspended in media. In varying embodiments, the fluid reservoirs are made of one or more polymers, e.g., polyethylene, polypropylene and mixtures thereof. In some embodiments, the fluid reservoirs are comprised of high density polyethylene (HDPE).

In various embodiments, the spin elute tubes can be formed using a blow-molded process. When formed using a blow molded process, the blow mold comprises an additional portion (2) between the tube body (1) and the tube cap (3). This additional portion is a removable piece that is used during the production process. This additional portion also allows for the slight differential in diameter between the tube body and tube cap that allows the cap to twist onto the body of the tube.

3. Methods of Using Spin Elute Tube

The spin elute tubes find use in efficiently, quantitatively and sterilely collecting cells retained in a microfluidic chip. In varying embodiments, one, two or three microfluidic chips containing fluid and retained cells are placed in a spin elute conical tube, with the fluid outlet of the microfluidic chips (9) oriented towards the narrow orifice or outlet of the spin elute tube nipple portion. The spin elute tubes attached to a 0.5 mL PCR tube (11) and containing the one or more microfluidic chips are placed in a centrifuge rotor bucket that accommodates 50 mL conical tubes. In varying embodiments, the centrifuge has swinging bucket rotors. The centrifuge is run for a short period of time, e.g., about 5 or fewer minutes, e.g., about 4, 3, 2 or 1 minute, at a relatively low centrifuge speed, e.g., about 300×g or lower, e.g., about 200×g or 100×g. Centripetal force causes the fluid and cells retained in the microfluidic chips to flow out of the microfluidic chips, though the narrow orifice of the nipple portion of the spin elute tube and into the 0.5 mL PCR tube (11) attached to the spin elute tube. Optionally, the microfluidic chips can be removed from the spin elute tube, refilled with an isotonic solution (e.g., cell culture media, phosphate buffered saline), and centrifuged again one or more times to remove any cells still remaining in the microfluidic chip after the first centrifugation. The 0.5 mL PCR tube (11) attached to the spin elute tube can accommodate the volume of two volumes of a microfluidic chip.

EXAMPLES

The following examples are offered to illustrate, but not to limit the claimed invention.

Example 1

SpinElute Circulating Tumor Cell (CTC) Flow cell harvest

This protocol describes the procedures for recovering captured cells from the Cynvenio CTC Flow cell after processing on the Liquid Biopsy Protocol system.

Materials
1. Elution Buffer (optionally w/0.5% triton)
2. 70% ethanol

Equipment
1. Corning 3750 Thermowell Gold PCR tubes, 0.5 mL, Flatcap (Fisher Cat #07-200-396)
2. Cynvenio SpinElute CTC recovery tube
3. Branson 1510 Sonicating water bath
4. IEC Centra CL3R table top centrifuge
5. Tissue culture petri dish
6. Tygon R-3603 (1/16 in. I.D., 1/8 in. O.D., Wall Thickness: 1/32 in.), 7-10 mm lengths (VWR Cat #63010-232, Fisher cat #: 14-168-111)
7. p1000 Pipetteman Protocol
1.1. Ensure all counting and photographing of CTC Flow cell and contents has been completed.
1.2. Apply the PCR tube to the base of the SpinElute recovery tube.
1.3. Snap the cap to SpinElute recovery tube
1.4. Label the PCR tube both lid and side appropriately.
1.5. Place a few drops of 70% ethanol onto the base of a petri dish.
1.6. Place CTC flow cell face up on top of the drop of ethanol.
1.7. Hold petri dish on surface of Branson sonicating water bath and engage sonicator for 15 to 20 seconds to dislodge trapped material, which includes trapped cells and possibly small magnetic particles.
1.8. Remove cap from the SpinElute tube and insert CTC Flow cell waste port first into the tube.
1.9. Recap and centrifuge for 1 min at 100×g with fast accel/decel in a swinging bucket rotor.
1.10. Remove CTC flow cell from SpinElute recovery tube
1.11. Place a 7-10 mm piece of tygon tubing on a p1000 tip and introduce 27 μl, Elution buffer into the waste port on a flat surface.
1.12. Place a few drops (~50 μl) of 70% ethanol onto the base of a petri dish.
1.13. Place CTC flow cell face up on top of the drops of Ethanol.
1.14. Hold petri dish on surface of Branson sonicating water bath and engage sonicator for 15 to 20 seconds to dislodge trapped material, which includes trapped cells and possibly small magnetic particles.
1.15. Remove cap from the SpinElute tube and insert CTC Flow cell waste port first into the tube.
1.16. Recap and centrifuge for 1 min at 100×g with fast accel/decel in a swinging bucket rotor.
1.17. Recover PCR tube and replace flat top cap on PCR tube
1.18. Pellet cells in swinging bucket centrifuge at 5000×g, RT for 10 minutes.
1.19. Decant supernatant with a p200 tip leaving no more than 54, buffer on the cell pellet.
1.20. Freeze pellet at −20° C. until pellet is processed using Genomic DNA Recovery Protocol.
1.21. Dispose appropriately of CTC flow cell and SpinElute tube.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:
1. An open-ended conical tube comprising:
i) a nipple portion (7), wherein the nipple portion (7) comprises a length in the range of 0.2 to 0.3 inches, an outer diameter in the range of 0.2 to 0.3 inches, wherein the nipple portion (7) comprises a narrow orifice;

ii) a conical portion (5) attached to and in fluid communication with the nipple portion, wherein the conical portion (5) has a length in the range of 1.0 to 1.5 inches and the angle of the outer surface of the conical portion (5) of the tube in relation to the outer surface of a cylindrical portion (1) of the tube is between 30° to 45°, wherein an outer circumferential surface of the conical portion (5) is attached to a flange (6) comprising a cylindrical cavity (12), wherein the cylindrical cavity (12) is formed into the surface of the flange (6), and the flange (6) is attached to the outer circumferential surface of the conical portion (5) of the tube such that the opening of the cylindrical cavity (12) extends perpendicularly with respect to the longitudinal axis of the tube, wherein a cap of a PCR tube fits into the cylindrical cavity (12) in the flange (6);

iii) the cylindrical portion (1) attached to and in fluid communication with the conical portion (5) and having an axis substantially co-linear with an axis of the conical portion (5), wherein the cylindrical portion (1) comprises a wide orifice and threads (8) on the outer surface abutting the wide orifice to accommodate a cap for the conical tube, wherein the cylindrical portion (1) comprises a length in the range of 2.2 to 2.8 inches, an outer diameter in the range of 1.10 to 1.19 inches along its entire length and an inner diameter configured to accommodate one or more microfluidic chips or slides.

2. The conical tube of claim 1, further comprising a 0.5 mL PCR tube (11), wherein the nipple portion is sealed to the interior of the PCR tube.

3. The conical tube of claim 1, further comprising a cap for the conical tube that twists onto the threads (8) on the outer surface of the cylindrical portion (1) abutting the wide orifice.

4. The conical tube of claim 1, wherein the conical tube is comprised of high-density polyethylene.

5. The conical tube of claim 1, wherein the conical tube is produced by a molding process.

6. The conical tube of claim 1, wherein the conical tube is produced by a blow molding process.

7. The conical tube of claim 1, wherein the conical tube further comprises a microfluidic chip (13) inside the tube.

8. A method of collecting cells from a microfluidic chip, comprising:
   a) placing the microfluidic chip into the conical tube of any one of claims 2 to 6, wherein an outlet of the microfluidic chip (9) is placed towards the nipple portion (7);
   b) centrifuging the microfluidic chip inside of the conical tube; and
   c) collecting the cells in the 0.5 mL PCR tube (11) sized to seal to the conical tube.

9. The method of claim 8, wherein the centrifuging is at about 300×g or less.

10. The method of claim 8, wherein the centrifuging is in a swinging bucket rotor.

11. The method of claim 8, wherein the method is performed under sterile conditions.

12. The method of claim 8, further comprising the step of refilling the microfluidic chip with an isotonic fluid and repeating steps a) through c).

13. The conical tube of claim 1, wherein the inner surface of the cylindrical portion (1) comprises raised parallel ridges (10) for accommodating one or more microfluidic chips or slides in the tube.

14. The conical tube of claim 1, wherein the thickness of the walls of the tube are in the range of about 0.030 to about 0.10 inches.

15. The conical tube of claim 1, wherein the cylindrical cavity in the flange fits the cap of the 0.5 mL PCR tube sufficiently snugly such that the cap remains anchored in the flange during centrifugation.

16. The conical tube of claim 1, wherein the flange does not substantially increase the diameter of the cylindrical portion of the conical tube such that the conical tube with the flange can fit in the well of a centrifuge bucket.

* * * * *